US008134569B2

(12) United States Patent
Etscheid et al.

(10) Patent No.: US 8,134,569 B2

(45) Date of Patent: Mar. 13, 2012

(54) APERTURE COMPRESSION FOR MULTIPLE DATA STREAMS

(75) Inventors: Brian Etscheid, Sunnyvale, CA (US); Mark S. Grossman, Palo Alto, CA (US); Warren Fritz Kruger, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1132 days.

(21) Appl. No.: 11/951,184

(22) Filed: Dec. 5, 2007

(65) Prior Publication Data

US 2009/0147015 A1 Jun. 11, 2009

(51) Int. Cl.

*G06F 12/00* (2006.01)
*G06F 12/02* (2006.01)
*G06F 13/00* (2006.01)

(52) U.S. Cl. ......................... 345/564; 345/565; 345/537

(58) Field of Classification Search .................. 345/502, 345/504, 541, 564–574; 700/24, 26; 711/1–3
See application file for complete search history.

(56) References Cited

U.S. PATENT DOCUMENTS 7,289,125 B2 * 10/2007 Diard et al. .................. 345/501
2009/0019219 A1 * 1/2009 Magklis et al. ............... 711/105

* cited by examiner

*Primary Examiner* — Aaron M Richer
*Assistant Examiner* — Robert Craddock
(74) *Attorney, Agent, or Firm* — Volpe and Koenig, P.C.

(57) ABSTRACT

A hardware-based aperture compression system permits addressing large memory spaces via a limited bus aperture. Streams are assigned dynamic base addresses (BAR) that are maintained in registers on sources and destinations. Requests for addresses lying between BAR and BAR plus the size of the bus aperture are sent with BAR subtracted off by the source and added back by the destination. Requests for addresses outside that range are handled by transmitting a new, adjusted BAR before sending the address request.

12 Claims, 8 Drawing Sheets

2 GPUs

| | |
|---|---|
| 0 | Pixel Write (Color, Z) |
| 1 | Command Write |
| 2 | Vertex Write |
| 3 | DMA 0 even |
| 4 | DMA 0 odd |
| 5 | DMA 1 even |
| 6 | DMA 1 odd |
| 7 | additional phase |

4 GPUs

| | |
|---|---|
| 0 | Neighbor Pixel Write |
| 1 | Neighbor Cmd/Vert Write |
| 2 | Neighbor DMA 0 |
| 3 | Neighbor DMA 1 |
| 4 | GPU2 Graphics |
| 5 | GPU2 DMA |
| 6 | GPU3 Graphics |
| 7 | GPU3 DMA |

Fig. 6

APERTURE COMPRESSION FOR MULTIPLE DATA STREAMS

TECHNICAL FIELD

The disclosure is generally related to computer architecture and memory management. In particular it is related to memory management in systems containing multiple GPUs.

BACKGROUND

A graphics processing unit (GPU) is a dedicated graphics rendering device for a personal computer, workstation, or game console. Modern GPUs are very efficient at manipulating and displaying computer graphics, and their highly parallel structure makes them more effective than typical CPUs for a range of complex algorithms. A GPU implements graphics primitive operations in a way that makes running them much faster than drawing directly to the screen with the host CPU.

Multiple GPU systems use two or more separate GPUs, each of which generates part of a graphics frame or alternate frames. The work of multiple GPUs is mixed together into a single output to drive a display.

When multiple GPUs work together their overall performance depends in part on the speed and efficiency of data transfers between GPUs. In today's multi-GPU systems, multiple reads and writes from one device to another over the system bus (e.g. the PCI Express bus) must all be either strictly ordered or all allowed to be unordered. There is no distinction for sub-device sources and destinations. In other words there is no support for multiple independent data streams each with its own rules. Furthermore there is no inherent mechanism for determining whether or not a particular write stream has completed. The PCI Express bus provides only a restricted number of prioritized traffic classes for quality of service purposes.

Memory-to-memory transfers between devices are more efficient when the memory is mapped into system bus space. In some cases, however, mapping is not possible because the size of the aperture available for peer to peer transfers is less than the size of the memory to be mapped. One or more software programmable offsets may be used to provide windows into a larger memory space. However, this approach does not work when a single chunk of memory exceeds the window size.

BRIEF DESCRIPTION OF THE DRAWINGS

The drawings are heuristic for clarity.

FIG. 6 shows example write phase assignments for two- and four-GPU systems.

FIG. 8A shows logic used to compress address requests in sources while

DETAILED DESCRIPTION

A multi-GPU system and methods for handling memory transfers between multiple sources and destinations within such a system are described. In the system, read and write requests from one or more sources, or clients, are distinguished by stream identifiers that implicitly accompany data across a bus. Requests and completions may be counted at data destinations to check when a stream is flushed. Ordering rules may be selectively enforced on a stream by stream basis. Tags containing supplemental information about the stream may be passed less frequently, separate from data requests.

A hardware-based aperture compression system permits addressing large memory spaces via a limited bus aperture. Streams are assigned dynamic base addresses (BARs), identical copies of which are maintained in registers on sources and destinations. Requests for addresses lying between (BAR) and (BAR plus the size of the bus aperture) are sent with BAR subtracted off by the source and added back by the destination. Requests for addresses outside that range are handled by transmitting a new, adjusted BAR before sending the address request.

Aperture compression is extended to include information in addition to BARs. For example, streams may be further identified with tags representing priority, flush counters, source identification or other information. Separate pairs of sources and destinations may then simultaneously use one aperture in memory space. Each path from source to destination is associated with a phase within a memory aperture.

The system and methods described here for multi-GPU applications are further applicable to any system that uses multiple data streams and/or a bus with limited shared address space.

Figure 1:
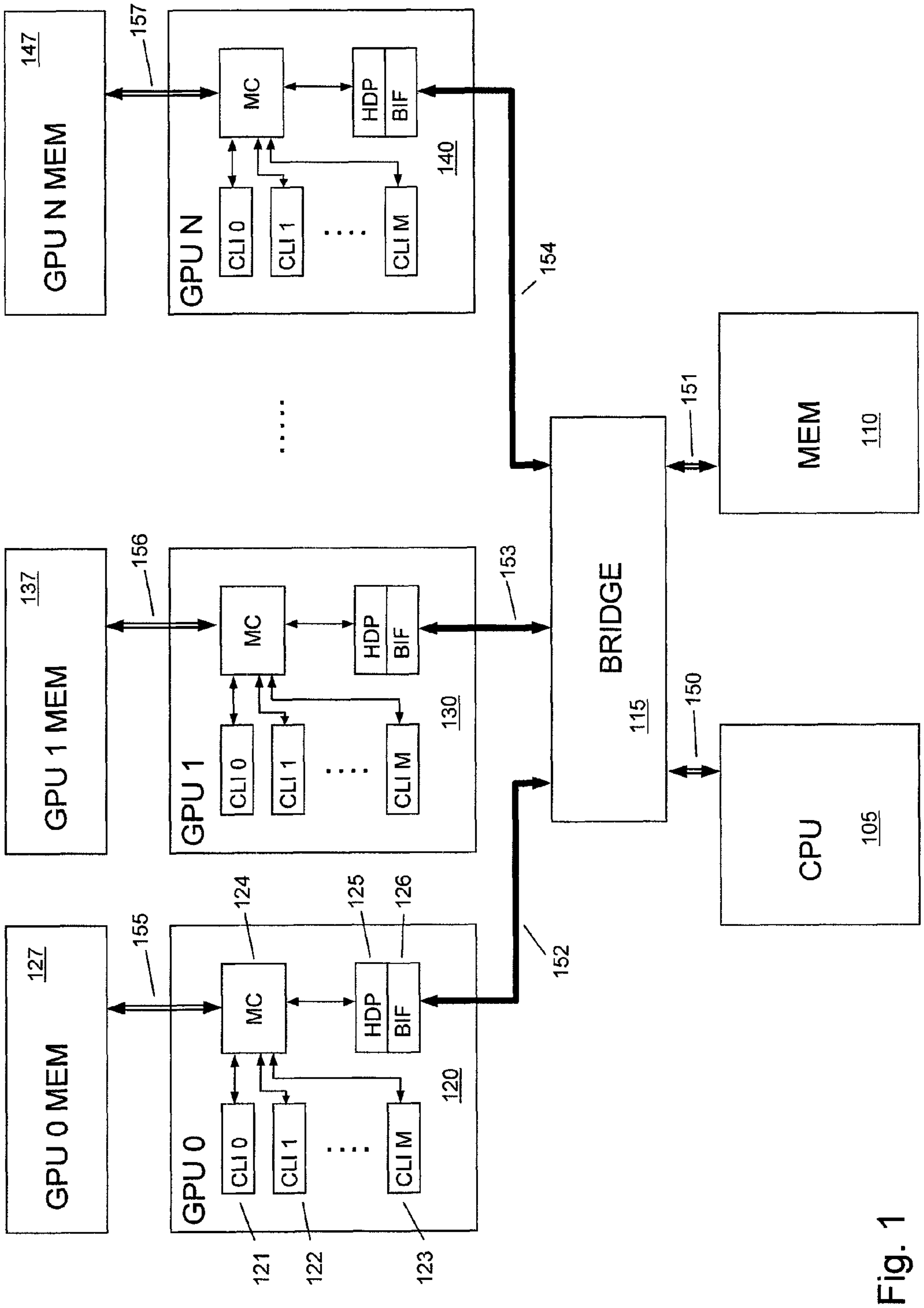
FIG. 1 is a block diagram showing multiple GPUs and a CPU in a computer system.

FIG. 1 is a block diagram showing multiple GPUs and a CPU in a computer system. The system contains a CPU 105, host memory 110 and bridge 115. The CPU is connected to the bridge and the bridge is connected to the host memory via a bus (e.g. double-data-rate, DDR bus) represented by arrows 150 and 151.

The system also contains N multiple GPUs designated GPU 0 (120), GPU 1 (130), . . . , GPU N (140). Each GPU is connected to the bridge via a bus (e.g. the PCI Express bus) represented by arrows 152, 153 and 154. Each GPU is also connected to its own local memory via a bus (e.g. double-data-rate, DDR bus) represented by arrows 155, 156 and 157.

Each of GPUs 120, 130, 140 contains a bus interface (BIF), a host data path (HDP), a memory controller (MC) and several clients labeled CLI 0, CLI 1, . . . , CLI M. In GPU 120 clients 0 through M are identified as items 121, 122 and 123; the memory controller is item 124; the host data path and bus interface are items 125 and 126 respectively. Local memory for GPU 0 is shown as item 127. Local memory for GPUs 1 and M are shown as items 137 and 147 respectively.

Clients within each GPU are physical blocks that perform various graphics functions. In a multi-GPU system, clients within each GPU may need access not only to the local memory attached to their GPU, but also to the memory attached to other GPUs and the host memory. For example, client 1 in GPU 1 may need access to GPU 0 memory. The number of bits required to address the combined memory of the host and that of each of N GPUs using conventional addressing techniques may be greater than the number of address bits that can be handled by bus 152, 153, 154.

A memory aperturing system and method in which HDP blocks in each GPU manage base address registers enables clients in each GPU to address a larger memory space than would otherwise be possible. Furthermore the aperturing system is transparent to the clients. In other words the clients need not be aware of address space limitations of the bus. The basic aperturing scheme is further extended by the management of additional information in the HDP blocks. The additional information includes tags such as stream identifiers, priority information and flush counters.

Figure 2:
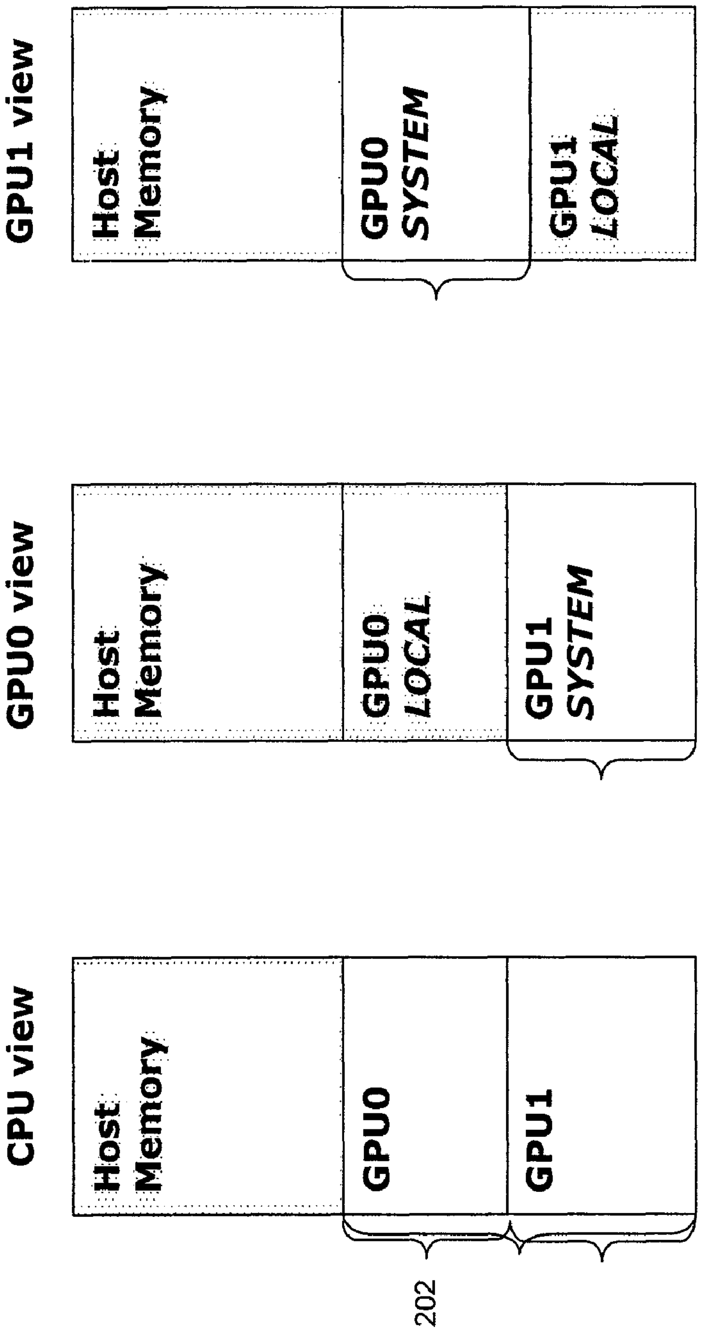
FIG. 2 shows a simplified system memory space with two GPUs.

FIG. 2 shows a simplified system memory space with one CPU and two GPUs. Braces, such as braces 202, represent the size of the frame buffer aperture which is determined by the operating system configuration of a bus, for example the PCI Express (PCIE) bus. In the system represented by FIG. 2 each of the GPUs and the CPU sees the same address space. However, the range of addresses that one GPU can access in another GPU's memory is limited by the size of the frame buffer aperture. "LOCAL" highlights the part of memory that is accessible to a GPU without using the PCI Express bus while "SYSTEM" labels memory that is only accessible over the bus. As an example, GPU 1 must address GPU 0's memory via the PCIE bus.

Figure 3:
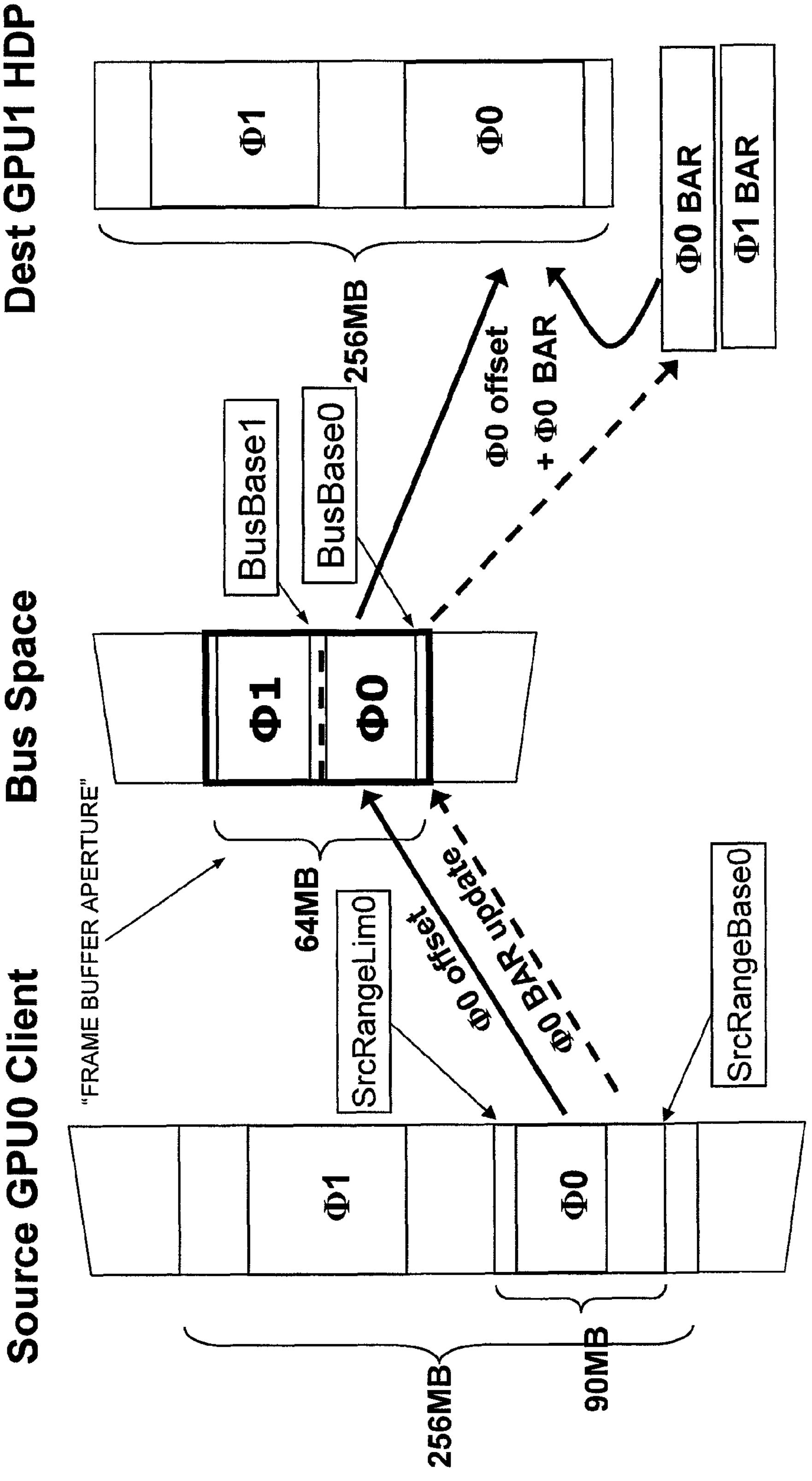
FIG. 3 is a schematic diagram of memory addressing from a client to a destination via an aperture.

FIG. 3 is a schematic diagram of memory addressing from a client to a destination via an aperture. In FIG. 3, a client on GPU 0 uses memory attached to GPU 1. The client sees a 256 MB address space, yet the bus over which memory requests are sent supports a frame buffer aperture that is only 64 MB in size. (Clearly the actual sizes of these address spaces are arbitrary; the point is that the bus aperture is smaller than the size of the total memory address space.)

In the work of a typical GPU client, memory requests do not occur randomly over the entire memory address space. Instead, the requests are often grouped into one or more regions of memory. As examples, a client might need to write data to a series of contiguous memory addresses or to copy data from one block of memory to another. In FIG. 3 "ϕ0" and "ϕ1" represent regions within a large space in another GPU's memory in which one or more clients on GPU 0 are working. These regions are associated with two "phases" which may be thought of as streams of traffic that occur over a period of time, possibly overlapping in time, and possibly initiated by the same client. Each of the two memory regions are delineated by a pair of Source Range registers: a base address register (e.g. SrcRangeBase0) and a limit address register (SrcRangeLim0). These values are initialized and reinitialized from time to time by software to reflect the range of peer GPU memory needed by clients. When a client presents an address to the GPU0 MC/HDP logic, the phase ID may be determined by a combination of the client ID and by comparing that address to the Source Range values. Memory requests with addresses that do not fall within any Source Range are treated as requests for other destinations such as GPU0's local memory or host memory.

Phases also correspond to non-overlapping sub-apertures, or address ranges, within the compressed frame buffer aperture or "Bus Space" in FIG. 3. In other words, the phase number—in this example a one-bit value—is used to offset addresses used on the bus into one or other of the two sub-apertures.

Once the phase ID of a peer GPU memory request is determined, dynamic base addresses (Phase BARs) of ϕ0 and ϕ1 ("phase 0" and "phase 1") are used to allow the original address to be compressed into a current Dynamic BAR value and an Offset. The Phase BARs are managed by the MC of the source GPU (GPU 0 in this example). The MC stores the Phase BAR values of all phases in registers and communicates that information to the HDPs on other GPUs as needed. Each phase also has an associated Bus Base register (BusBase0, BusBase1) that points to the starting address of each bus sub-aperture. The Offset calculated above is added to the Bus Base for transmission to the destination GPU. The destination GPU (GPU 1 in this case) must decode the addresses it receives in order to determine which sub aperture (and thus which phase ID) they fall in, and thus recover the Offset value. The recovered phase ID and offset combined with the previously stored Phase BAR produce the original address.

The compression of address space, meaning the ability to address a large space through a small bus aperture, is transparent to the client. The phase BARs are maintained in HDP registers and the source and destination HDPs subtract and add the BARs and send offsets from the BARs across the bus. The client need not "know" about the aperture and therefore the synchronization penalty associated with software managed address mapping is eliminated.

Figure 4A:
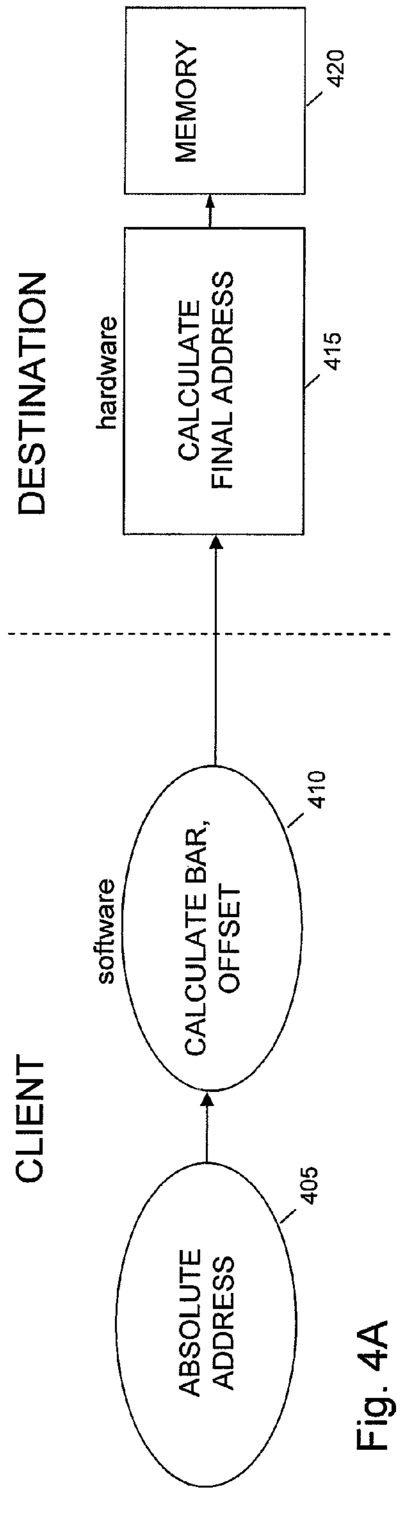
FIG. 4A illustrates a conventional, software-based memory addressing method.
Figure 4B:
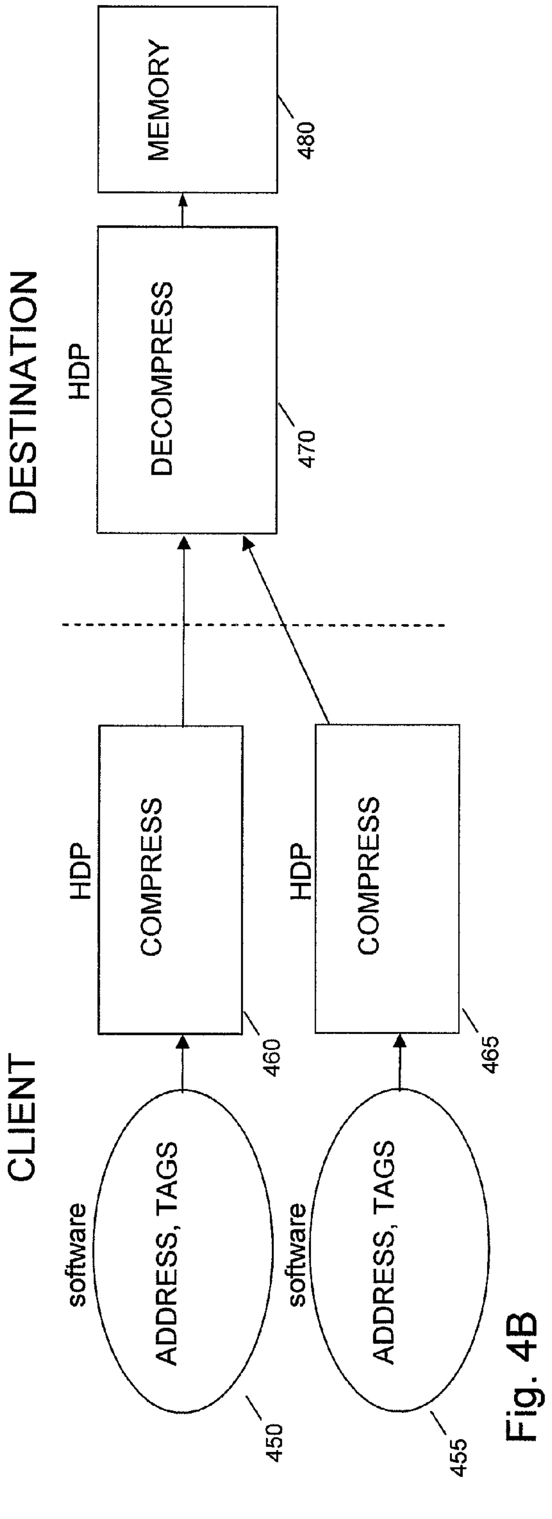
FIG. 4B illustrates a hardware-based compression method for memory addressing.

FIGS. 4A and 4B illustrate schematically memory addressing from a client to a destination. FIG. 4A illustrates a conventional, software-managed address mapping scheme. In FIG. 4A a request 405 for an absolute address is managed by software 410 which calculates a BAR and offset. That information is communicated across a bus to destination hardware 415 that calculates the final address and sends the request to memory 420. The scheme of FIG. 4A is limited in that hardware is constrained to work within a defined memory sub-aperture between software updates. This is especially time consuming for chip to chip requests when all requests in flight have to drain before software can update the sub-aperture mapping.

FIG. 4B illustrates a hardware-based address mapping scheme that further includes the ability to tag memory requests. In FIG. 4B multiple requests, 450 455, for absolute addresses, each accompanied by additional tag information, are issued by a client or clients in a GPU. Host data paths (HDP), 460 465, compress the address and tag information for transmission across a bus. At the destination HDP 470 decompresses the address and tag information and sends the request to memory 480. In the scheme of FIG. 4B, software in clients that issue memory requests need not be concerned with limitations of a bus. The clients can operate as if the bus were large enough to handle the entire available memory space because the HDPs in the source and the destination take care of memory aperturing. Furthermore, since the number of address bits per request is reduced, the hardware-based address mapping scheme can be extended to include attaching additional tag information to memory requests. The tags, which may include sending client ID, priority, or other information, are automatically compressed and decompressed by the HDP hardware. This method allows multiple phase BAR updates to be in flight simultaneously between a source and a destination—something that is not possible in the software-based scheme of FIG. 4A.

Figure 5:
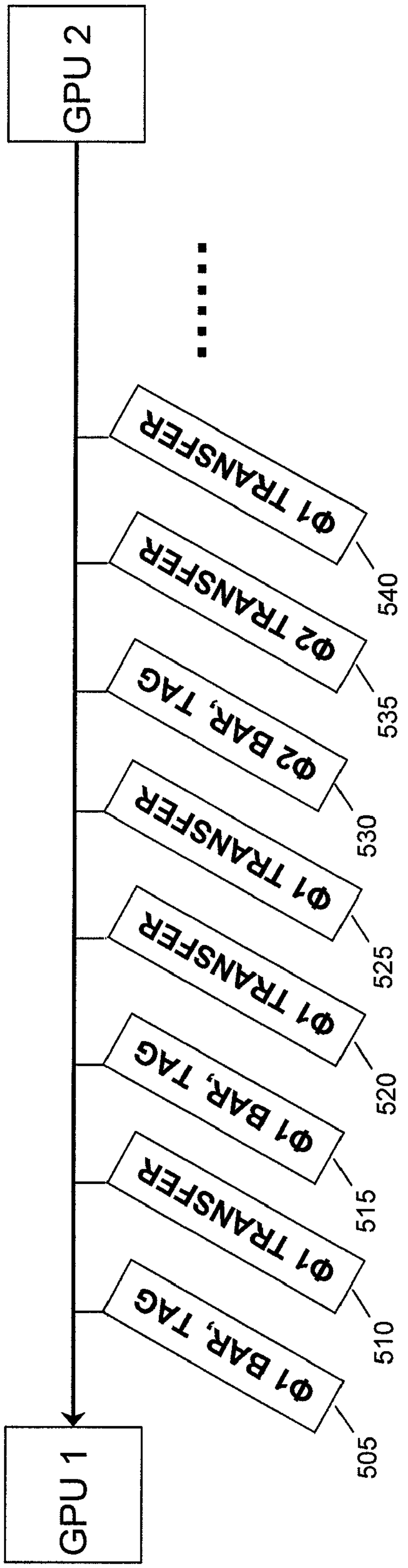
FIG. 5 shows an example of requests from one GPU to another.

FIG. 5 shows an example of requests from one GPU to another. In FIG. 5 a series of requests traveling along a bus from GPU 2 to GPU 1 is illustrated. The requests are represented schematically in boxes 505, 510, 515, 520, 525, 530, 535 and 540. The earliest request, 505, is a message from the HDP in GPU 2 to the HDP in GPU 1 setting the ϕ1 BAR (phase 1 base address) and tag. Next is a ϕ1 transfer, for example a series of writes to memory within phase 1. In 515, the ϕ1 BAR and tag are set to new values; i.e. the phase 1 aperture refers to a new segment of the destination memory. Two more phase 1 transfers 520 and 525 follow the new ϕ1 BAR setting (515). As long as transfer 525 uses the same ϕ1 BAR and tag as transfer 520, there is no need to set the ϕ1

BAR and tag between transfers 520 and 525. The ϕ2 BAR and tag are set in box 530 and a phase 2 transfer 535 follows. Finally another phase 1 transfer 540 follows. Again, there is no need to reset the ϕ1 BAR for transfer 540 if the ϕ1 BAR for that transfer is the same as it was for transfer 525, and ϕ1 and ϕ2 traffic may be interleaved.

The system of phases and tags identifies data streams traveling on a bus. The phase and tag information in use at a destination can change while requests or transfers are in flight from one GPU to another. However, once a series of requests or transfers has been launched, the order of the requests and transfers in the series may not change between source and destination.

FIG. 6 shows example write phase ID assignments for two- and four-GPU systems. In the example labeled "2 GPUs" eight phase IDs are assigned for write requests occurring in a two-GPU system. These phase IDs correspond to clients within the GPUs whose memory requests generally fall within different address ranges in memory, and will use different sub-apertures within the bus aperture. For example, in the two GPU system, phase ID 0 is used by clients engaged in pixel write operations. These pixel writes are further tagged as color pixel writes or Z pixel writes. Thus tags distinguish two types of traffic within one phase. The destination HDP uses both the phase ID and tag information to decompress addresses associated with pixel writes. Phase IDs 1 and 2 are assigned to command write and vertex write clients respectively. Direct memory access operations on GPUs 0 and 1 use phase IDs 3, 4, 5 and 6; phase ID 7 is an additional ID that may be assigned to clients on an as-needed basis. Of course, a smaller or greater number of phase IDs could be used and the phase IDs could be assigned to clients in either of the two GPUs in any number of different ways. The grouping of clients and phases in a scheme similar to that shown tends on average to reduce the frequency of phase BAR and tag updates, thereby increasing overall efficiency.

In FIG. 6 the example labeled "4 GPUs" shows possible phase assignments for a system of four GPUs. Since the number of phases in this example is still just eight, each phase is now assigned to requests for more clients. In a four-GPU system there are likely to be more requests between logical neighbor GPUs than between logically distant GPUs. GPU 0 is likely to have more requests pass between it and GPU 1 than to other GPUs. Therefore, four out of eight phases in the four-GPU example are devoted to transfers between logical neighbor GPUs. These four phases handle the traffic that was spread among eight phases in the previous example. Phase 0 handles neighbor pixel writes while phase 1 handles neighbor command and neighbor vertex writes. Neighbor DMA 0 is handled on phase 2 while neighbor DMA 1 is handled on phase 3. (In the two-GPU example, each of DMA 0 and DMA 1 was further subdivided into even and odd channels, each with its own phase.) Finally phases 4-7 are devoted to transfers to the third and fourth GPUs; i.e. GPU 2 and GPU 3. Phase 4, GPU 2 graphics encompasses pixel write, command write, and vertex write operations to GPU 2 while phase 5 encompasses all GPU 2 DMA operations. Similarly, phases 6 and 7 are assigned to GPU 3 operations.

It is possible to use more phases. However, as more phases are used, each one corresponds to a smaller sub-aperture in the frame buffer. It is also possible to use fewer phases. However, then more clients are required to share a given phase, and more frequent phase BAR updates are required. Too few phases leads to thrashing the BAR. It is most efficient to use a number of phases roughly equivalent to the number of separate regions of memory that are likely to see high activity at any one time.

Figure 7:
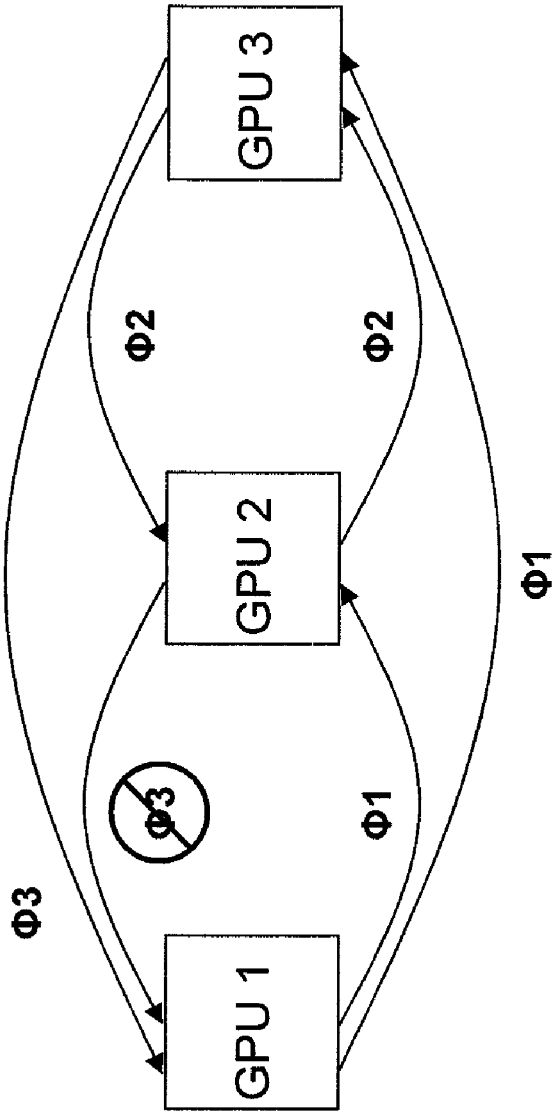
FIG. 7 shows schematically phases that may exist between GPUs in a multi-GPU system.

The phases also allow clients send requests to multiple destinations using sub-apertures within a single frame buffer aperture set by the bus. For example, in a two-GPU system, phases or memory sub-apertures may not overlap within the frame buffer aperture. However, in a system of more than two GPUs, phases may overlap if they connect distinct pairs of sources and destinations. (A distinct pair is defined as a source/destination pair that differs from another pair by the source, the destination, or both.) FIG. 7 shows schematically phases that may exist between GPUs in a multi-GPU system.

In FIG. 7 a set of three GPUs is shown with possible phase assignments between them. The phases are represented by arrows which point from sources to destinations. For example, phase 1 ("ϕ1") is defined with GPU 1 as the source and GPU 2 as the destination. Phase 1 is also defined with GPU 1 as the source and GPU 3 as the destination. Phase 2 is defined bi-directionally between GPU 2 and GPU 3. Phase 3 is defined with GPU 3 as the source and GPU 1 as the destination. Phase 3 and phase 1 may correspond to sub-apertures that overlap within the frame buffer aperture because phase 1 and phase 3 do not share a common destination.

Given the phase assignments illustrated in FIG. 7 it would not be possible to define another phase 3 with GPU 1 as the destination. For example, if an assignment of phase 3 with GPU 2 as the source and GPU 1 as the destination were allowed, interleaved requests from GPUs 2 and 3 would use the same phase BAR register for decompression which would lead to unpredictable results. The phase illustrated from GPU 2 to GPU 1 is labeled with ϕ3 crossed out, indicating that ϕ3 is not an acceptable phase assignment in that situation.

Figure 8A:
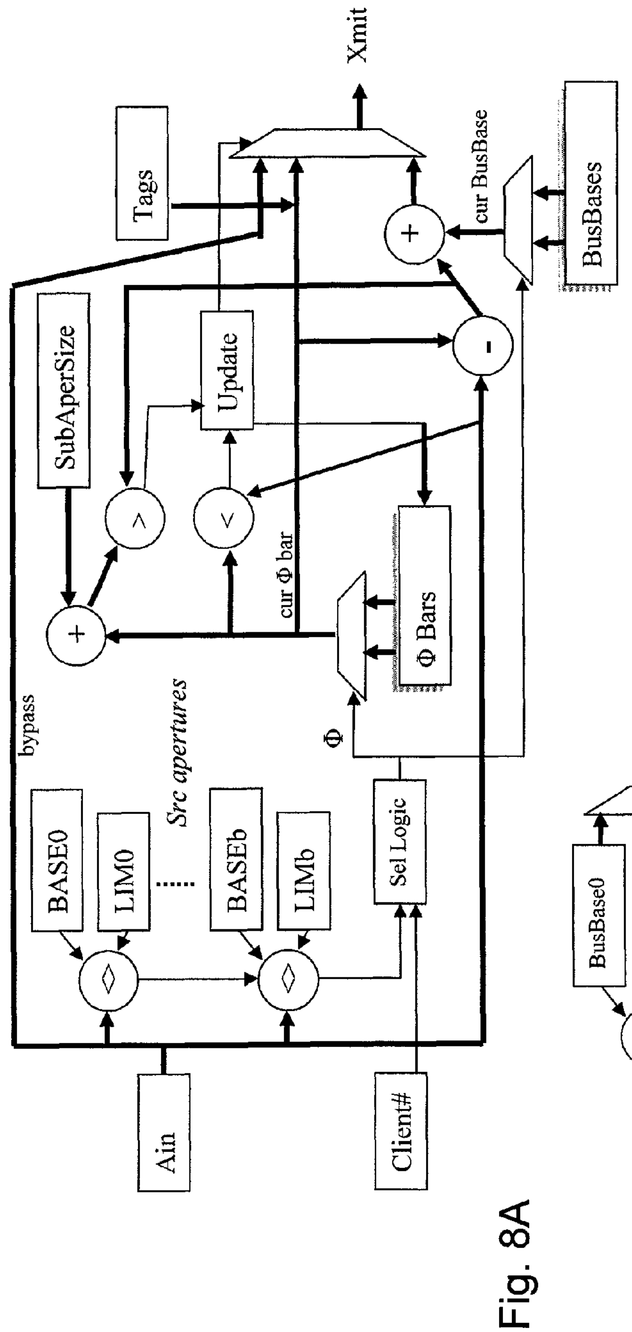
Figure 8B:
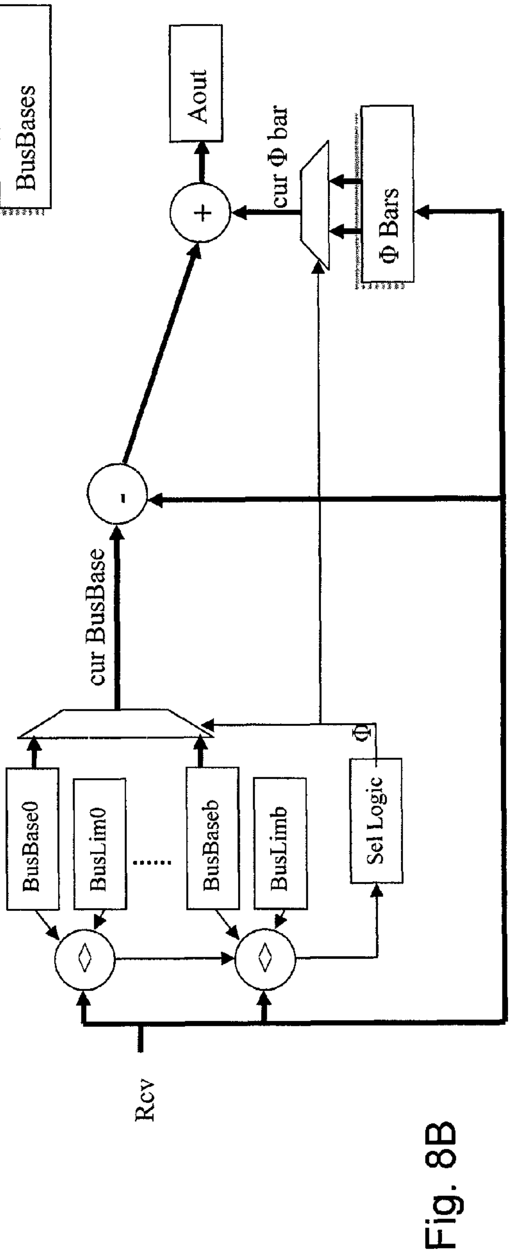
FIG. 8B shows logic used to decompress requests in destinations.

FIG. 8A shows logic used to compress address requests in sources while FIG. 8B shows logic used to decompress requests in destinations.

Given a client address request, Ain, the logic illustrated in FIG. 8A is used to generate a request sent across a bus as Xmit. For compression of address requests, software preloads Source Range registers BASE0 through BASEb and LIM0 through LIMb for the number of phases supported, and SubAperSize representing the size of the bus sub-aperture for a single phase. A client memory request includes full address Ain and optionally a client number.

If Ain falls within one of the Source Ranges i defined by BASE0 through BASEb and LIM0 through LIMb (where $0 \leqq i \leqq b$), then the phase, ϕ, is set to i; otherwise Ain is sent directly to Xmit. (Ain falls within range i if ($BASEi \leqq Ain$) and ($Ain \leqq LIMi$).)

Once i is determined, one of the Phase BARs (ϕ BARs) is selected using ϕ. This ϕ BAR is called the Current ϕ Bar. Similarly one of the BusBases is selected and called Current BusBase.

Then if (Current ϕ Bar>Ain) or ((Ain>(Current ϕ Bar+SubAperSize) then the Current ϕ Bar is updated according to: Current ϕ D Bar=Ain+bias, and the new Current ϕ Bar along with Tags is sent as a Phase BAR update to Xmit. Finally Offset=(Ain−Current ϕ Bar+Current BusBase) is sent to Xmit.

Given a compressed address request, Rcv, the logic illustrated in FIG. 8B is used to reconstruct an absolute address, Aout. For decompression of address requests, software preloads BusBase0 through BusBaseb and BusLim0 through BusLimb corresponding to values used on the Source GPU, where BusLimi=BusBasei+SubAperSize.

If Rcv value is a Phase BAR update then the corresponding ϕBar register is updated. Otherwise Rcv is compared to the BusBase and BusLim ranges to determine ϕ. For example, if ($BusBasei \leqq Rcv$) and ($Rcv \leqq BusLimi$) then recovered phase ϕ is set to i.

Once i is determined, one of the BusBases is selected and called Current BusBase. Similarly, one of the Phase BARs ($\phi$ BARs) is selected using $\phi$. This $\phi$ BAR is called the Current $\phi$ Bar. Aout, the full reconstructed address, is then determined by Aout=(Rcv−Current BusBase+Current $\phi$ Bar).

The systems and methods described above may be further extended and refined as will be clear to those skilled in the art. As an example, given a request for a particular memory address, an HDP may set an aperture around that address in order to best suit the memory traffic pattern. For example, an aperture may be centered on the address or set such that the address lies at the top or bottom of the aperture. Furthermore, HDPs can be programmed to store aperture locations and switch between stored settings based on tag information.

Further still, HDPs can be programmed to automatically adjust apertures without explicit BAR update instructions thereby saving bus bandwidth. For example, consider a client that performs block memory copies with incrementing addresses. An HDP could be programmed to automatically add a preset amount to the BAR once the compressed address received is greater than the preset amount above the BAR.

Aspects of the invention described above may be implemented as functionality programmed into any of a variety of circuitry, including but not limited to electrically programmable logic and memory devices as well as application specific integrated circuits (ASICS) and fully custom integrated circuits. Some other possibilities for implementing aspects of the invention include: microcontrollers with memory (such as electronically erasable programmable read only memory (EEPROM)), embedded microprocessors, firmware, software, etc. The software could be hardware description language (HDL) such as Verilog and the like, that when processed is used to manufacture a processor capable of performing the above described functionality. Furthermore, aspects of the invention may be embodied in microprocessors having software-based circuit emulation, discrete logic (sequential and combinatorial), custom devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A memory aperturing system comprising:

a source, including:

a client; and a source host data path block;

a destination, including a destination host data path block;

a bus connecting the source and the destination; and a memory attached to the destination; wherein, the source host data path block and the destination host data path block compress client memory requests such that the client can access memory addresses that would otherwise be too large to fit in an address aperture of the bus;

the source host data path block sends a base address and an offset to the destination host data path block, wherein the offset is calculated by subtracting the base address from the client memory request; and the destination host data path block obtains the client memory request based on the received base address and the received offset.

2. The system of claim 1, wherein the bus is a Peripheral Component Interconnect Express bus.

3. The system of claim 1, wherein the source and the destination are graphics processing units.

4. The system of claim 1, wherein the source host data path block sends additional information associated with the client's memory request to the destination host data path block.

5. The system of claim 4, wherein the additional information identifies a priority of the client's memory request.

6. A memory aperturing system, comprising:

three or more processing units connected by a bus, each processing unit including:

a local memory;

at least one client; and a host data path block;

wherein the host data path blocks compress client memory requests such that each client may access memory addresses that would otherwise be too large to fit in an address aperture of the bus; and the host data path blocks manage one or more memory sub-apertures to handle memory requests between one or more pairs of processing units, each pair of processing units including a source processing unit and a destination processing unit.

7. The system of claim 6, wherein the bus is a Peripheral Component Interconnect Express bus.

8. The system of claim 6 wherein the processing units are graphics processing units.

9. The system of claim 6, wherein the sub-apertures overlap in memory space only for pairs of source processing units and destination processing units not having a destination processing unit in common.

10. A method for compressing client memory requests, comprising:

providing a source, a destination, and a bus, the source containing a client;

providing base address registers in the source and the destination;

in the source, subtracting a base address from a client's memory address request to obtain an offset;

sending the base address to the destination over the bus and storing the base address in the destination's base address register;

sending the offset to the destination over the bus;

in the destination, adding the base address stored in the destination's base address register to the offset to obtain the client's original memory request.

11. The method of claim 10 further comprising:

sending additional information over the bus to the destination.

12. The method of claim 11, wherein the additional information includes a tag identifying the client.

* * * * *